Jan. 7, 1930. J. MAGNUSSON ET AL 1,743,018
REGISTERING MECHANISM
Filed Jan. 27, 1927 4 Sheets-Sheet 3
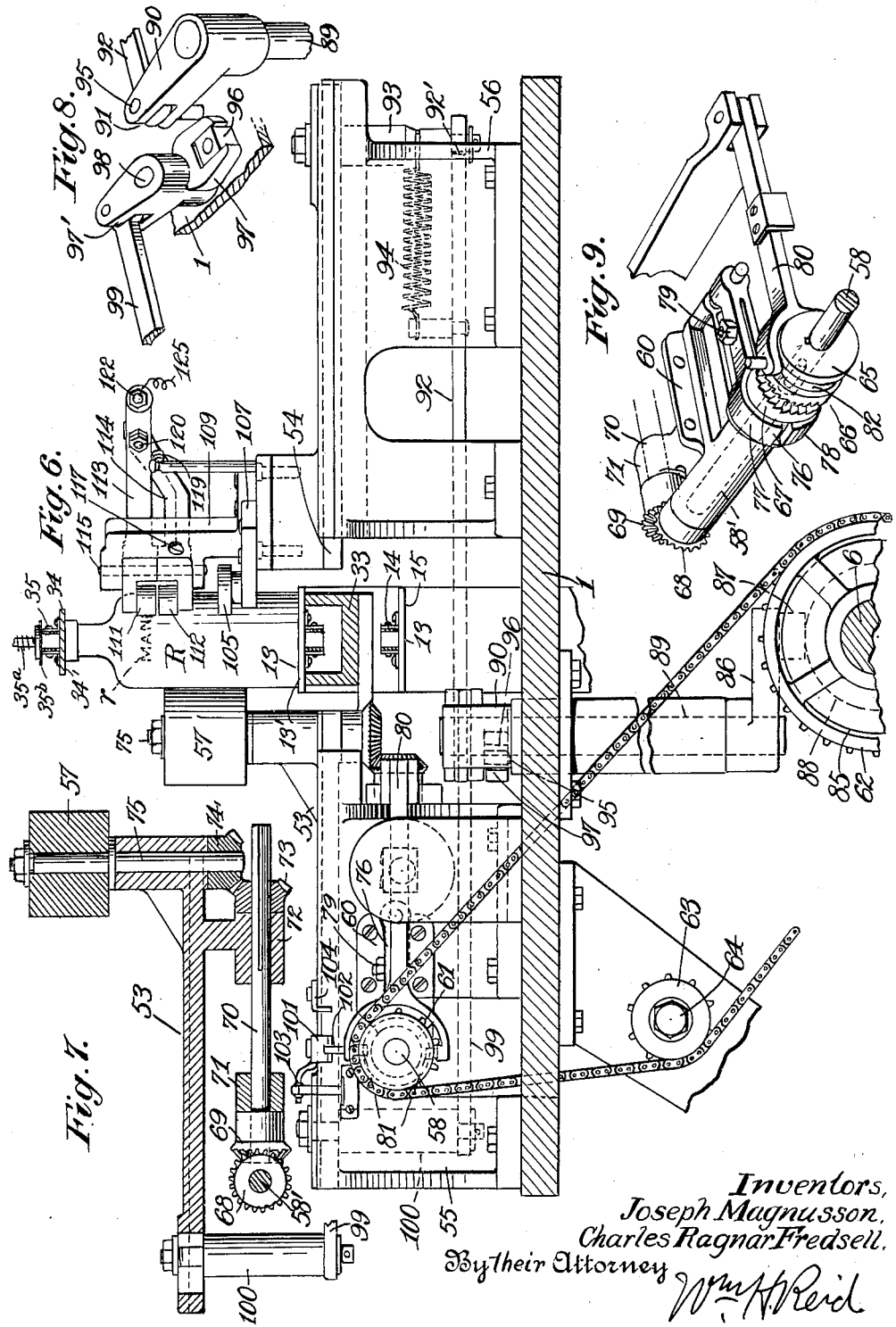
Inventors,
Joseph Magnusson,
Charles Ragnar Fredsell.
By their Attorney Jan. 7, 1930.  J. MAGNUSSON ET AL  1,743,018
REGISTERING MECHANISM
Filed Jan. 27, 1927   4 Sheets-Sheet 4
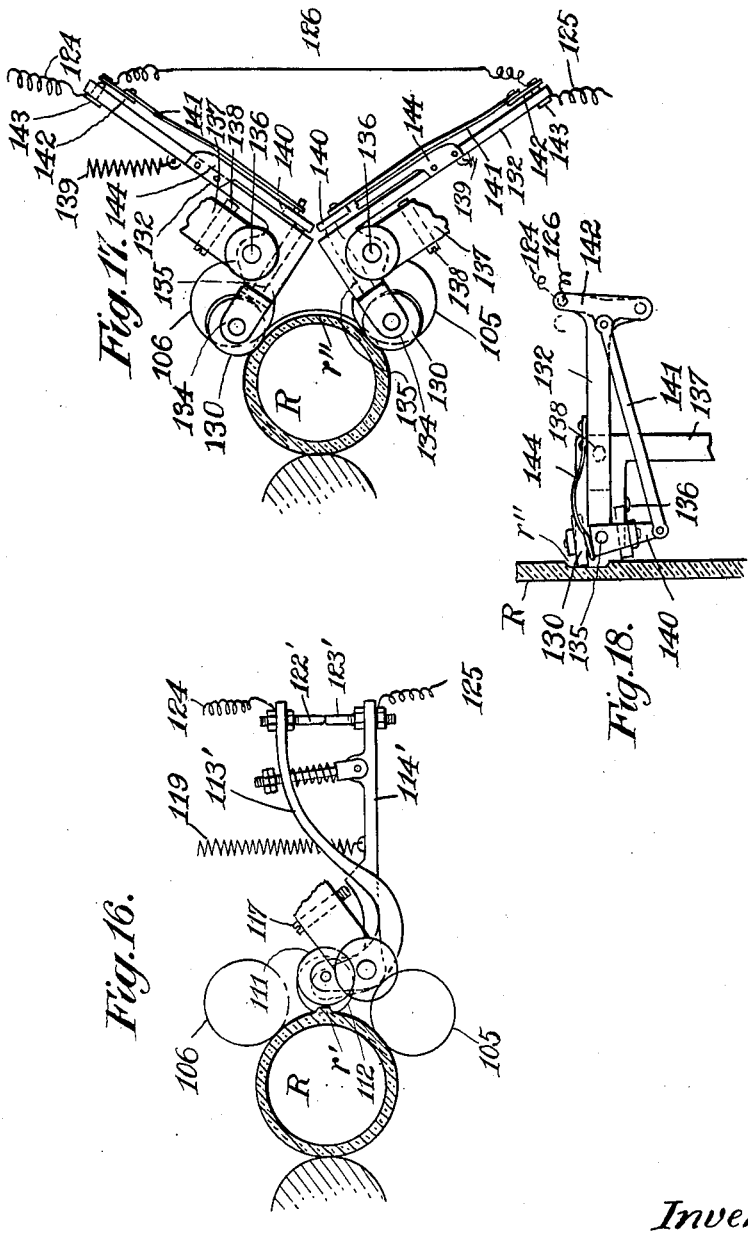
Inventors
Joseph Magnusson
Charles Ragnar Fredsell
By their Attorney Wm H. Reid Patented Jan. 7, 1930

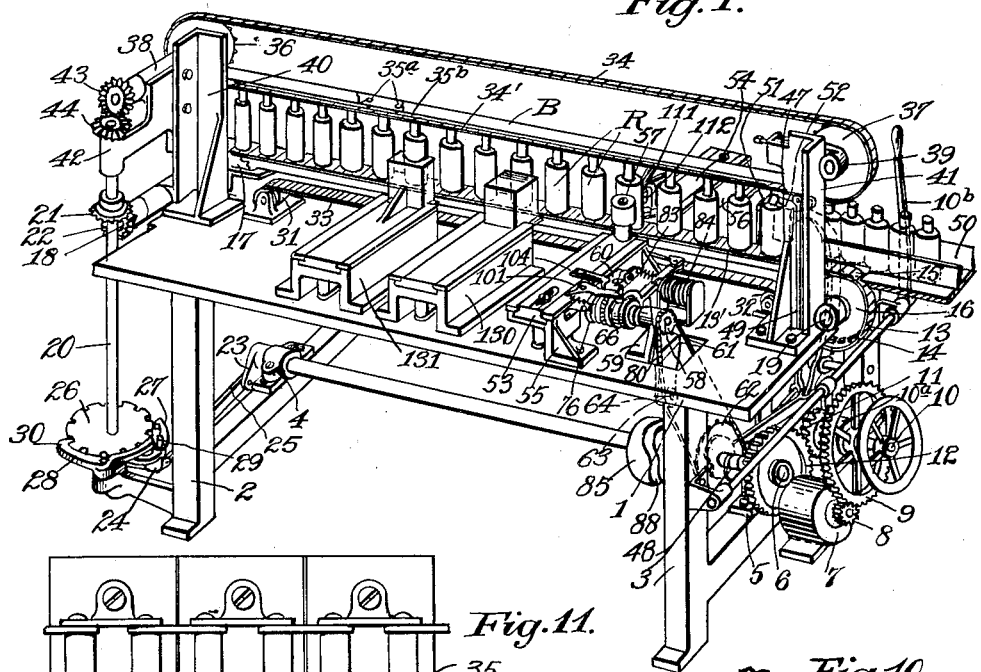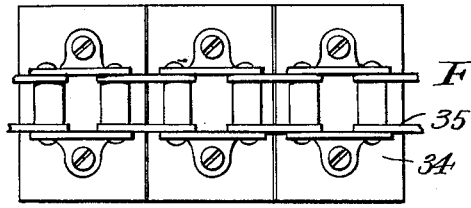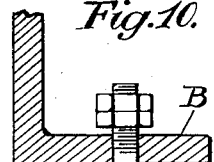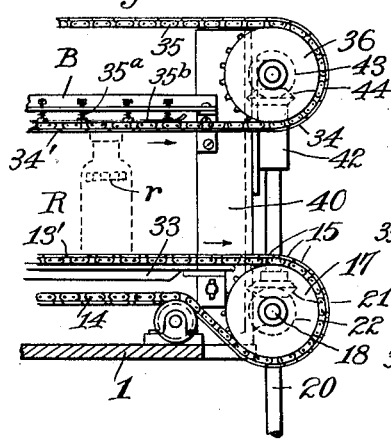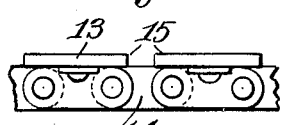

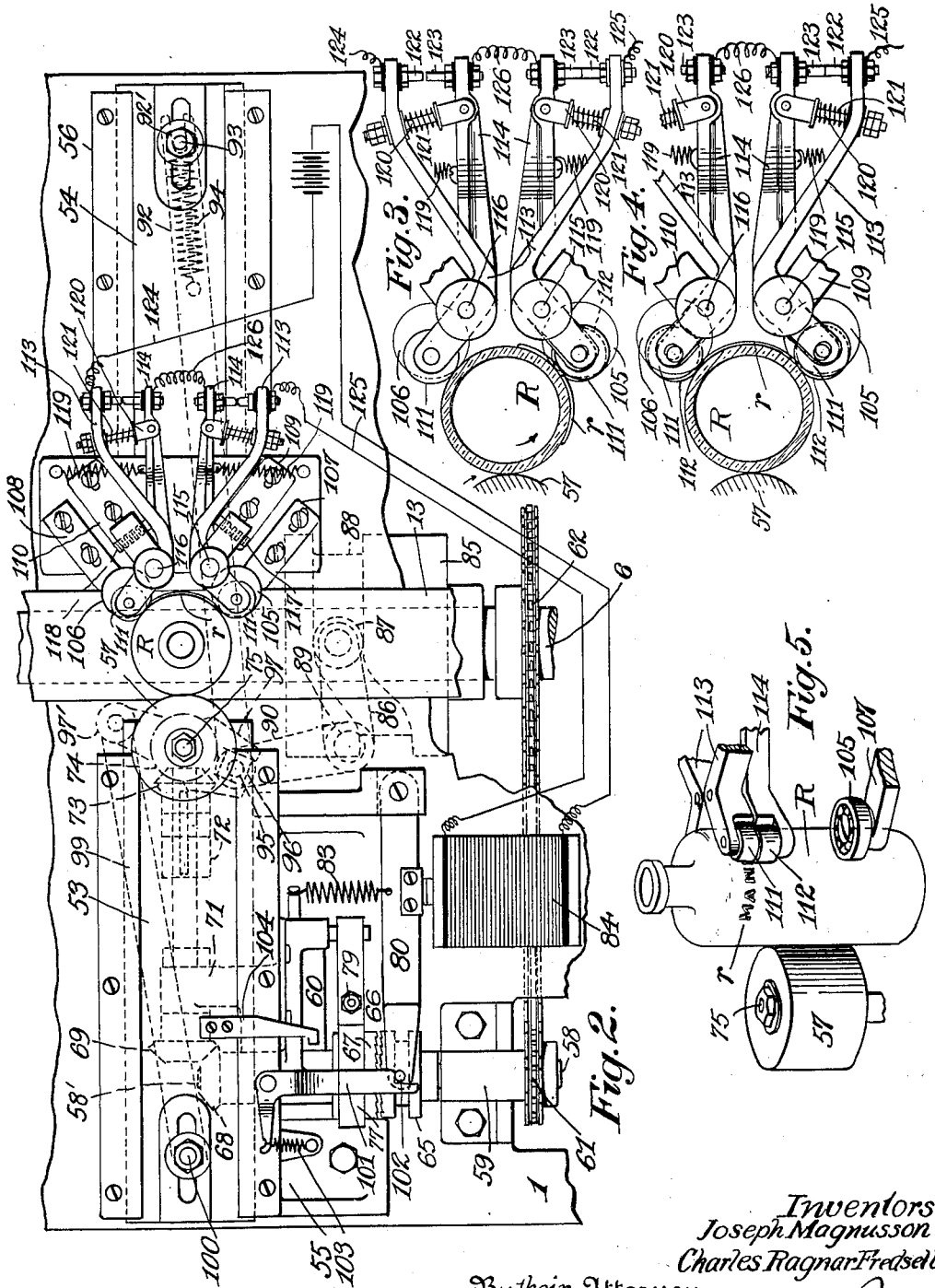

1,743,018

UNITED STATES PATENT OFFICE

JOSEPH MAGNUSSON AND CHARLES RAGNAR FREDSELL, OF NEW YORK, N. Y., ASSIGNORS TO McDONALD ENGINEERING CORPORATION, OF NEW YORK, N. Y., A CORPORATION OF NEW YORK

REGISTERING MECHANISM

Application filed January 27, 1927. Serial No. 164,114.

This invention relates to registering means, and refers more particularly to feed means such as conveyer belts or other carrying mechanism for transporting articles or receptacles, from a supply source, to stations along a machine at which certain operations are performed on the articles. Many such articles are prepared with designation marks, such as embossed or raised surfaces, and the operations performed on the article should register with the raised surfaces, to this end, this registering mechanism is provided to position the articles on the feed member with relation to the embossed portion, after the same have been deposited on the feed member from a hopper or other source, without regard to the location of the embossed portions.

One object of this invention is to provide means of this kind in connection with automatic machines, wherein cylindrical articles having raised surfaces such as letters on the periphery near which a label is applied to line up with such letters or symbols, the articles being fed from a supply in rapid motion to one or more stations, to have such work performed thereon, after passing the registering means that will position the articles, on a conveyer in a certain relative position.

It is a further object to reliably position such articles moving at a high rate of speed, and retain the articles in such registered position on the feed member passing from one station to another.

A still further object is to provide means whereby the article upon reaching a certain station along its travel, is engaged by a member to turn said article, and when the same has been turned to a predetermined position, further means arrest such rotation, and hold the articles in said position with relation to the conveying member as the same is moved to succeeding stations.

A further object of the invention is to provide a conveyer supporting member in conjunction with a member that will engage the top of the article by a yielding pressure, to firmly hold said articles in position on the main carrying conveyer, whereby the articles may be transported along several stations, said holding member also serving as a cover member for open top receptacles.

It will be understood the registering means may be used on various kinds of cylindrical work, for other than that described herein, the following is merely one form of its use.

A train of mechanism is provided including a conveyor belt, preferably intermittently propelled, receiving at one end the articles to be treated, in this case a glass cylindrical bottle, having raised letters on its periphery, that are introduced on the belt in any convenient manner, without regard to the raised letters, and fed step by step along a table of a labeling machine. A holding means may also be provided, in the form of a conveyer belt but arranged to engage the top portions of the articles under a yielding tension, said holding means traveling along in unison with the main carrying or article supporting conveyer whereby the articles are brought to the first station to be engaged by the registering means. These include a pair of slide members, one of which has a driving roller, driven through a clutch member, whereby the roller may be instantly stopped and started, and controlled by another slide, which carries idler rolls, preferably two, spaced apart to form with the said driving roller on the other slide, a three point contact for the article to be registered. The two slide members are brought together, with the driving roller revolving, until the raised letters of the article reach a predetermined position with relation to the belt. This is accomplished by a pair of rollers located with respect to the raised letter surface of the bottle on the conveyer belt at the position desired. The bottle is then held in this relative position on the belt as it is advanced to the several stations; such as a station to apply a label to the bottle in a predetermined position with respect to the raised letters; then to another station to have the label numbered, or any other work performed.

In the accompanying drawings showing one embodiment of our invention:

Fig. 1 is a perspective view of the labeling machine.

Fig. 2 is a plan view of a portion of the machine showing the registering means having just actuated a bottle to a registered position, also showing diagrammatically the electrical connection to the clutch actuating means.

Figs. 3 and 4 are diagrammatical views showing a part of the registering means.

Fig. 5 is a detail view in perspective of an article, showing a portion of the registering means.

Fig. 6 is a cross sectional view of the machine and showing in end elevation the parts shown in Fig. 2.

Fig. 7 is a detail of the gearing to rotate the registering roller.

Fig. 8 is a perspective view of the parts for actuating the slides that carry the registering mechanism.

Fig. 9 is a detail of the clutch and brake means.

Fig. 10 is a sectional view of the conveyer holding member.

Figs. 11, 12 and 13 are detail views of parts of the conveyers.

Fig. 14 is a view of one end of the conveyer, and holding member, showing the driving means, and supporting frame.

Fig. 15 is a detail view showing the belt lifting means.

Fig. 16 shows a switch mechanism for a single designation mark on a receptacle.

Figs. 17 and 18 shows a modification of depressed designation and switch mechanism arranged therefor.

As shown in the drawings, the labeling mechanism is provided with a table 1 supported at each end by legs 2 and 3 which carry bearings 4 and 5, in which a shaft 6 is journaled for rotation, being driven by a motor 7 through a pinion 8 on the motor shaft, meshing with a suitable spur gear 9 on a short shaft 10 on which a pinion 11 drives a spur gear 12 on the end of shaft 6.

A conveyer belt 13 supports and advances articles from one end to the other of the table, along which stations are provided at which the articles are brought to rest by an intermittent movement of the belt. The belt 13 is formed by chain links 14 each of which are provided with plates 15 fastened thereto to form a suitable platform on which the articles may rest, the belt being thus provided over its entire length, in endless belt fashion and is mounted on a pair of sprocket wheels 16 and 17 located one at each end of the table, on shafts 18 and 19 the latter being an idler shaft.

The shaft 18 is driven by miter gears 21 and 22 from vertical shaft 20, while shaft 20 is rotated intermittently from shaft 6. This shaft 6 rocks an arm 24 by a link 25 to move a toothed wheel 26 fast on the vertical shaft 20, by a pawl 27 carried by the arm 24, by means of which intermittent motion is imparted to the belt. A locking member 28 is controlled by a pin or cam projection 29 carried by the rock arm 24 to engage one arm of the locking member 28 to unlock a toothed arm 30 of this member from the toothed wheel 26, on one stroke of the link 25 during the shifting of the wheel, and thereby move the belt 13. On the return stroke of the link, the tooth arm 29 drops into one of the notches of the tooth wheel 26 and locks the same while the conveyer belt is at rest, in a well known manner.

A pair of idler rollers 31 and 32 are located close to the sprocket wheels 16 and 17 lifting the return strand of the belt; these idler rollers are mounted in brackets that may be adjusted to take up the slack of the belt. The top strand of the belt 13' may be supported on a rail 33 to provide a uniform surface of the belt platform member 14 to support the articles. A supplemental belt 34 is provided in the form of a holding member built up of chain links 35 forming an endless belt passing over sprockets 36, 37, supported in bearings 38, 39, for up and down adjustment on standards 40 and 41, to vary the distance between the top of the article carrying belt 13 and the under side of the top holding 34, to enable adjustment for various length of articles to be fed along the belt.

The top belt is also driven, to have a movement to coincide with the lower belt, so as to have the lower strand of the belt run in harmony with the top strand of the lower carrying belt. For this purpose the vertical shaft 20 is extended upward, and has a bearing 42 formed integral with the bearing 39, so that when the latter is adjusted up and down the bearing 42 moves with it. A pair of miter gears 43 and 44 similar to the gears 21 and 22 impart motion to the belt 34, so that the lower strand 34' of the top belt, and the top strand 13' of the lower belt, run in the same direction, and in unison.

A suitable clutch 10$^a$ is provided controlled by a hand lever 10$^b$, to stop and start the machine. To hold the receptacles under a tension between the strands 13' of the supporting belt and the strand 34' of the upper holding belt, a bar B is provided attached to the frame standards 40 and 41 to lie adjacent the strand 34' of the top belt, and the rail has at close intervals along its length, a series of spring plungers 35$^a$, see Figs. 10–14, that exert a pressure upon a flexible band 35$^b$, that rests against the chain links 35, and extends nearly the full length of the bar 13. The band 35ᵇ being stationary, the chain will travel along under the band, and receive a pressure that will be transmitted to the top of the articles, that may have slight variations in their height, carried on the supporting belt 13', to which the band will accomodate itself.

The receptacles are placed on the delivery table 50 at one side of the supporting belt 13, and moved to a stop 51 in any desirable manner, where a pusher 52 moves the receptacles one at a time onto the belt 13 each time the belt comes to rest, and the belt strand 34' is lifted at this point to allow the free entrance of the receptacle onto the conveyor belt 13 as the pusher 52 comes forward. This is done by an arm 47 engaging with the under side of the belt 34' to lift the same to permit the entrance of the receptacles, and the arm has an off-set end to reach under the belt which is located just in front of the pusher, and suitably connected to the cam 48 on shaft 6 by a cam rod 49 to slightly lift at the proper time and again release the belt for each movement of a receptacle onto the belt, see Figs. 1 and 15. The receptacles that may be cylindrical in form and designated by R, are thus moved till the first station is reached. Usually such receptacles have raised lettered surfaces r on their periphery extending partly around the same, and when the receptacles are received on the belt, this raised letter portion has no fixed relation to the belt, and since certain work is to be performed, such as applying a label to have a certain position with respect to the raised letters, a registering mechanism is provided. This registering mechanism as shown is located at the first station, and comprises a pair of cross slides 53 and 54 one at each side of the belt 13, that are mounted in slideway brackets 55 and 56. The slide 53 is provided with a roller 57, mounted on the slide to travel forward and back therewith, and connected by a driving train controlled by a clutch member, by which the roller may be rotated or instantly stopped. This train includes a two part clutch shaft, one part 58 being mounted on the table in a bearing 59, and the other part 58' in a bearing 60 carried by the slide-way bracket 55; the two shafts being telescoped at their inner ends for alignment.

The shaft 58 is constantly driven by a chain belt driving a sprocket 61 on the shaft end, motion being imparted to the chain by a sprocket 62 on the shaft 6; the chain passing over an idler 63 for adjustment of the chain, as shown at 64.

The shaft 58 carries one member 65 of a clutch 66, keyed to the shaft to rotate therewith, but shiftable to have engaging and disengaging action with a companion clutch member 67, fast on the shaft 58', by which the rotation of the shaft is controlled. To drive the roller 57, a pair of miter gears is provided, one of which as 68 is located on the free end of shaft 58' and meshes with the other gear 69 of the pair on a shaft 70. The shaft 70 is supported at one end for rotation in a bearing 71 that is a part of the bearing member 60, and supports the shaft centrally and longitudinally of the slide 53. The other end of the shaft is mounted in a bearing 72 forming a part of the slide, and the shaft is splined for a key connection to a miter gear 73 which meshes with a miter gear 74, the latter being on an upright shaft 75 on which the roller 57 is attached. By this means, the key in the gear 73 and spline in the shaft 70, the slide is actuated to and away from the receptacle without breaking the driving connections, except by the clutch member 66 to start and stop the rotation of the roller 57.

There is further provided a brake member 76 formed by a pair of semi-circular bands 77 and 78 that fit within a groove of the clutch member 67 and are held together by a tensioning bolt 79, so that the bands may be adjusted to the desired yielding tension to both instantly stop the rotation of the roller 57, when the clutch 65 is withdrawn from its companion clutch member 67, and to allow drive of the roller under this tension.

The clutch members 65 and 67 have preferably fine teeth, so instant engagement and disengagement may be had, and the member 65 is controlled by a clutch actuator lever 80, with bifurcated end having pins 81, engaging a groove 82 in the clutch, while a spring 83 attached to the lever, and to a pin on the bracket 60 closes the clutch members, and a solenoid magnet 84 opens the clutch, which will be hereinafter described.

The slide 53, as well as the slide 54, are arranged to have a movement to and from the receptacle, transverse to the belt 13, so the receptacles may be free to pass from one to another station, when the slides are in their outer position. The slides are actuated simultaneously by a suitable cam 85 on the shaft 6, through a cam arm 86 and roll 87, riding in a groove 88 of the cam. The arm 86 fast on a rock shaft 89 imparts motion to an arm 90, which has a bifurcated end 91 for the reception of a link 92, reaching rearward to engage a stud 93 by a forked end 92' of the link, and held in position by a spring 94 to have a compensating movement for varying size receptacles, when the slides are in engagement with same.

A pin 95 in the arm 90 is the pivot pin for the link 92, and is of such length as to engage a block 96 of a rock arm 97, pivoted to the table 1, by a stud 98, see Fig. 8, and to be rocked by the arm 90. A link 99 engages the arm 97' of the rock arm, and is connected to a stud 100 of the slide 53. From the foregoing it will be seen, that the cam 85 and its connection operates the slides 53 and 54 simultaneously toward and away from each other.

Normally the clutch 66 is held open by a latch 101 mounted on the slide bracket 53 to engage a pin 102 on the clutch lever 80 by a spring 103 which throws the latch into engagement with a pin 102 when the solenoid magnet has opened the clutch; and on the final outward movement of the slide, a latch trip 104 carried by the slide, engages the latch and forces it away from the pin 102 of the clutch actuating lever, whereupon the spring 83 will close the clutch, that will start the roller 57 to revolve.

On the slide 54 is provided means for locating the receptacles in position to be revolved to the desired position on the belt with respect to the raised letters, and means for stopping the rotation of the receptacles when such position has been reached, comprising a pair of contact members that control a pair of switches effective to energize the solenoid magnet to open the clutch, when the receptacle has revolved to the proper position on the belt, and thereby stop the rotation of the roller 57.

The locating means comprises a pair of positioning rollers 105 and 106, so located on the slide 54, on adjustable holders 107 and 108, that the rollers 105, 106 and 57 form a three point positioning or centering means for the receptacles, when the two slides 53 and 54, are at their inner position, these rollers being preferably provided with ball bearings, as seen in Fig. 5.

When the slide members 53 and 54 come to this inner position and make contact with the receptacles, the spring 94 on the link 92 will permit a yielding movement of the slide 54 to compensate for varying size receptacles and of uneven contour, and prevent the breaking of the receptacles if such are of glass.

To stop the receptacles upon bringing the letters to a predetermined position on the belt, and close the circuit to energize the magnet, a pair of switch members are provided, located above the rollers 105 and 106, one at each side of the receptacle in adjustable brackets 109 and 110. Each bracket carries a pair of contact rollers 111 and 112 separately mounted to have independent movement on rock arms 113 and 114, both of which are pivoted on the pivots 115 and 116, in ears of the brackets 109 and 110.

The rollers are so positioned on the brackets that the faces thereof will be inside of the contour of the receptacle, when the slides are apart, but prevented from rocking too far in this direction by stop screws 117 and 118 provided for each bracket, that contact with the rock arms 114 of each pair this being the lower arm of each pair and these arms are urged against the stop screws, by springs 119. The lower arms 114 are off-set, at their ends opposite the rollers to be in a plane with such ends of the upper arms 113, and are held in a relative position to each other by adjustable spring pressed connections 120, in the form of bifurcated threaded rods, the bifurcated end being pivoted to the arms 114, and the threaded stems passing through openings in the arms 113. The two arms of each set are held apart by a compression spring 121, and the separation of the two arms is controlled and limited by an adjusting nut and a check nut. The extreme ends of the arms 113 and 114 carry terminal studs 122, 123 adjustably secured and insulated from the arms. The studs are normally in their open position as in Fig. 3, as shown, at one side in this view, the other side having closed the contact studs, by the roller 111 having rocked the arm 113 by riding over the raised lettered surface $r$, of the receptacle which effects this movement. The receptacle as it is revolved to the position shown in Fig. 4, has closed both sets of the contact studs, and by this means closed the circuit, by the line connections 124 and 125 to the terminals on the arms 113 and the intermediate line connector 126 from the arms 114. From this it will be seen that the solenoid magnet 84 is energized when the terminals are brought to contact position, which occurs only when the raised letters of the receptacle are in the position indicated in Fig. 4, and thereby actuate the clutch actuator and stop the rotation of the roll 57. The receptacle comes to an instant stop, which is effected by the brake 76, the latch 101 catches over the pin 102 which holds the clutch open, as in Fig. 2 the return motion of the slides again opens the circuit since the compression springs 120 opens the terminals, and on the full return of the slide 53 the latch 101 is tripped and the roller 57 again revolves to repeat the registering of the next receptacle.

The receptacles after being thus positioned on the belt are intermittently advanced to the succeeding stations, as indicated in a general way at 130 and 131, where any desired operation may be performed, such as applying a label at one station, and pressing the label into close contact with receptacle at the other, etc.

It will be further noted that the receptacles are tensioned between the two strands of the supporting conveyer and holding belts, and that the adjusted position of the receptacles on the belt is maintained throughout its travel along the stations after being positioned at the registering station.

This apparatus as set forth includes conveying means for the bottle or receptacle, whereby it is brought to the station, it is positioned by the registering mechanism, and there-upon delivered from the station, as another article is presented, without any direct connection between the two articles. But it is to be understood that the apparatus is clearly operative for engaging the bottle, then turning the bottle to the proper position, and then the said devices are retracted. Therefore any other conveying mechanism could be employed, or the article might be presented by the operator to the turning means that are thereupon advanced to engage the article, and retracted after turned to the proper position.

It will be further noted that the receptacles may be provided with a single point raised portion r' as indicated in Fig. 16, and therefor only a single contact switch member is required to make and break the circuit which as shown provides the arms 113' and 114' arranged to bring the contact rolls 111 and 112 central of the receptacle to close the switch studs 122' as is done in the case of Fig. 3 at the top of said figure, except the line connection 124 and 125, is direct, omitting the short connector 126, as this is not required in the single switch connection.

In Figs. 17 and 18 however the receptacles instead of being provided with raised designations have depressed portions, as r'' in which case a double faced swivel roll contact member 130 is used, one of which at each side of the receptacle is mounted on oppositely disposed single carrying arms 132 also located one at each side of the receptacle. The roll 130 is mounted in a bifurcated member 134 with a shaft end 135 in a bearing of the arms 132 which latter is pivoted at 136 in a bracket 137, the arms being held against stop screws 138 by a spring 139 when in their normal position this being so when the slide on which they are mounted is retracted, when contact with the receptacle is made this causes the arm 132 to be shifted away from the stop screw with the roll 130 held in a parallel position to the receptacle, when the true periphery of the receptacle is presented, but when the depressed surface is presented, which as here provided only effects the lower face of the double faced roll and will tilt this roll as in Fig. 18, and by an arm 140 on the shaft end 135 and a connection 141, to a shiftable switch arm 142 will make the circuit by contact with studs 143 at the ends of arms 132. These arms have the line connections 124 and 125, and a connection 126 to the shiftable switch arms 142 to make the circuit complete only when the both rolls with one face portion thereof is tilted in the depressed portion r'' as will be understood. The rolls are normally held in a righted parallel position by a flat spring 144 on a flat portion of the arm 140.

What I claim is:

1. Means for positioning cylindrical articles in an upright position that carry designations in a relative position on a conveyor, comprising a supporting conveyor member that is advanced step by step to bring the articles to a certain station, means for turning the article axially on the conveyor between said step by step movements at said station to bring the article to a certain pre-determined position relative to the designation thereon, and means comprising a holder member in the form of a belt bearing on the top of the article to hold the article during the turning thereof, and movable in timed relation with the supporting conveyor to advance the article in the predetermined position to a succeeding station along the path of movement of said conveyor.

2. Means for positioning cylindrical articles in an upright position that carry designations in a relative position on a conveyor, comprising a supporting conveyor member that is intermittently advanced to bring the articles to a certain station, means for turning the aricle axially on the conveyor at said station to bring the article to a certain predetermined position relative to the designation thereon, and means comprising a holder member in the form of a belt bearing on the top of the article to hold the article during the turning thereof, and movable in timed relation with the supporting conveyor to advance the article in the predetermined position to a succeeding station along the path of movement of said conveyor.

3. Means for positioning articles that carry designations in a relative position on a conveyor, comprising a supporting conveyor member that is advanced to bring the articles to a certain station, a holder member in the form of a belt connected with the conveyor and driven in unison therewith, comprising a sectional link belt, a stationary flexible band and spring pressed plungers arranged in a supporting bar to press the band against the belt links to provide a yielding tension on the top of the articles to hold the articles on said supporting conveyor, and means for turning the article so held and supported at said station to bring the article to a certain predetermined position relative to the designation thereon.

4. Means for positioning articles that carry designations in a relative position on a conveyor, comprising a supporting conveyor member that is advanced to bring the articles to a certain station, means for turning the article on the conveyor at said station including a driving roller adapted to make contact with the article, means to back up the article in the form of idler rollers to act as a roller support to retain the article in its axial position on the conveyor during said turning action, said driving roller having a clutch mechanism interposed between the roller and source of driving power whereby said roller may be rotated or brought to instant rest, and means to operate the clutch mechanism.

5. Means for positioning articles that carry designations in a relative position on a conveyer, comprising a supporting conveyer member that is intermittently advanced to bring the articles to a certain station, a holder member connected with the conveyer to advance in unison therewith and in engagement with the article, means for turning the article on the conveyer at said station, and means for arresting the article from turning when brought to a certain position relative to the article designation.

6. Means for positioning articles that have raised portions extending in a transverse line, to arrest the articles in a certain relative position on a conveyor, comprising a supporting conveyor that is advanced intermittently to bring the articles to a certain station, means for turning the articles axially on the conveyor at said station, comprising a clutch driven article turning wheel, and means arranged for engagement with said raised portion for arresting the article at a certain position relative to the said raised portion comprising contact members arranged to make electric circuit to withdraw the clutch to stop the turning wheel and bring the article to rest in the predetermined position.

7. Means for positioning articles that have raised portions extending in a transverse line, to arrest the articles in a certain relative position on a conveyer, comprising a supporting conveyer that is advanced intermittently to bring the articles to a certain station, means for turning the articles axially on the conveyer at said station, and means arranged for engagement with said raised portion for arresting the article at a certain position relative to the said raised portion, comprising a pair of contact members arranged for engagement with the article, at said station and spaced apart to engage the end portions of the line of raised portions, and means connecting the latter means with said turning means to arrest the articles when engaged by both said contact means.

8. Means for positioning articles that have raised portions extending in a transverse line, to arrest the articles in a certain relative position on a conveyer, comprising a supporting conveyer that is advanced intermittently to bring the articles to a certain station, means for turning the articles axially on the conveyer at said station, means arranged for arresting the article at a certain position relative to the said raised portion, a pair of contact members arranged to engage the article at said station and spaced apart to engage end portions of said raised line on the article, said arresting means being controlled by an electric circuit, and a pair of switches in said circuit each adapted to be closed by one of said contact members when engaged by said raised portions to close the circuit at both switches and actuate the arresting means.

9. Means for positioning articles that carry designations in a raised line, at a relative position on a conveyer, comprising a supporting conveyer that is advanced to bring the articles to a certain station, a turning roll at one side of the conveyer at said station, means for rotating said roll from a power member including a movable clutch, a pair of contact rolls at said station to engage the opposite side of the article engaged by said turning roll, each of the contact rolls being movably pressed against the article, an electric circuit including a power device to actuate said clutch, a terminal member in said circuit for each of said contact rolls that is held open in the normal position of the contact rolls and upon both contact rolls being engaged by said raised line on the article and thereby shifted, both of said terminals are closed to energize said circuit and operate to open the clutch and arrest the said driving roll.

10. Means for positioning articles that carry designations in a raised line, at a relative position on a conveyer, comprising a supporting conveyer that is advanced to bring the articles to a certain station, a turning roll at one side of the conveyer at said station, means for rotating said roll from a power member including a movable clutch, a brake connected with the roller to cause its arrest upon release of the clutch, a pair of contact rolls at said station to engage the opposite side of the article engaged by said turning roll, each of the contact rolls being movably pressed against the article, an electric circuit including a power device to actuate said clutch, a terminal member in said circuit for each of said contact rolls that is held open in the normal position of the contact rolls and upon both contact rolls being engaged by said raised line on the article and thereby shifted, both of said terminals are closed to energize said circuit and operate to open the clutch and arrest the said driving roll.

11. Means for positioning articles that carry designations in a raised line, at a relative position on a conveyer, comprising a supporting conveyer that is advanced to bring the articles to a certain station, means for advancing the conveyer intermittently, a slide carrying a turning roll movable transversely to this conveyer at said station, means for rotating said roll from a power member including a movable clutch, a second slide carrying a pair of contact rolls movable at said station on the opposite side of the conveyer, means connected with the actuating means for the conveyer to advance said slides at said station, to engage the article on opposite sides at the rest period of the conveyer and to withdraw said slides and rolls, each of the contact rolls being movably pressed against the article, an electric circuit including a power device to actuate said clutch, a terminal member in said circuit for each of said contact rolls that is held open in the normal position of the contact rolls and upon both contact rolls being engaged by said raised line on the article and thereby shifted, both of said terminals are closed to energize said circuit and operate to open the clutch and arrest the said driving roll.

12. Means for positioning articles that carry designations in a raised line, at a relative position on a conveyer, comprising a supporting conveyer that is advanced to bring the articles to a certain station, means for advancing the conveyer intermittently, a slide carrying a turning roll movable transversely to the conveyer at said station, means for rotating said roll from a power member including a movable clutch, a second slide carrying a pair of contact rolls movable at said station on the opposite side of the conveyer, means connected with the actuating means for the conveyer to advance said slides at said station, to engage the article on opposite sides at the rest period of the conveyer and to withdraw said slides and rolls, each of the contact rolls being movably pressed against the article, an electric circuit including a power device to actuate said clutch, a terminal member in said circuit for each of said contact rolls that is held open in the normal position of the contact rolls and upon both contact rolls being engaged by said raised line on the article and thereby shifted, both of said terminals are closed to energize said circuit and operate to open the clutch and arrest the said driving roll, a latch connected with the shiftable clutch member adapted to lock it in open position when opened by said power device, and which latch is shifted to release the clutch to close when the slide and driving roll are retracted.

13. Means for positioning articles that have raised portions extending in a transverse line, to arrest the articles in a certain relative position on a conveyer, comprising a supporting conveyer that is advanced intermittently to bring the articles to a certain station, means for turning the articles axially on the conveyer at said station, a pair of contact members arranged to engage the article at said station and spaced apart to engage end portions of said raised line on the article, arresting means for the article controlled by an electric circuit, and a pair of switches in said circuit each adapted to be closed by one of said contact members when engaged by said raised portions to close the circuit at both switches and actuate the arresting means.

14. A conveyor device including a receptacle supporting conveyor, means for advancing the conveyor to carry receptacles to a certain station, a holder member movable with the conveyor to advance in unison therewith and to remain in engagement with the top of the receptacle and adapted to form a cover for the receptacle, and means for advancing the said conveyor and holder member in unison, and means for lifting a portion of the holder member between the ends thereof to permit of placing an article between the said members.

15. Means for positioning articles that have raised portions extending in a transverse line to arrest the articles in a certain relative position at a station comprising means for turning the articles at said station, means for advancing the turning means to engage the article, a contact member arranged to engage the end portion of the raised line on the article, means connected with the contact member to cause arrest of the turning means on said line end engagement, and means for withdrawing the turning means when the article is arrested in said certain position.

16. Means for positioning articles that have raised portions extending in a transverse line, to arrest the articles in a certain relative position at a station, comprising means for turning the articles at said station, means for advancing the turning means to engage the article, contact members arranged to engage both end portions of the raised line on the article, means connected with the contact member to cause arrest of the turning means on said line end engagement, and means for withdrawing the turning means when the article is arrested in said certain position.

17. Means for positioning articles that have raised portions extending in a transverse line to arrest the articles in a certain relative position at a station comprising means for turning the articles at said station, means for advancing the turning means to engage the article, a contact member arranged to engage the end portion of the raised line on the article, means connected with the contact member to cause arrest of the turning means on said line end engagement, said means including an electric circuit controlled by the contact member, and means for withdrawing the turning means when the article is arrested in said certain position.

18. Means for positioning articles that have raised portions extending in a transverse line, to arrest the articles in a certain relative position at a station, comprising means for turning the articles at said station, means for advancing the turning means to engage the article, contact members arranged to engage both end portions of the raised line on the article, means connected with the contact member to cause arrest of the turning means on said line end engagement, and means for withdrawing the turning means when the article is arrested in said certain position, said arresting means being controlled by an electric circuit, and a pair of switches in said circuit each adapted to be closed by one of said contact members when engaged by said raised portions to close the circuit and actuate the arresting means.

19. Means for positioning articles that carry designations in a raised line at a relative position at a station, comprising a slide carrying a turning roll movable to and from the article at said station, a second slide carrying a pair of contact rolls movable at said station on the opposite side of the conveyer, means to advance said slides to engage the article on opposite sides and to withdraw said slides and rolls, an electric circuit including a power device and also a clutch, a terminal member in said circuit for each of said contact rolls that is held open in the normal position of the contact rolls and upon both contact rolls being engaged by said raised line on the article and thereby shifted, both of said terminals are closed to energize said circuit and operate to open the clutch and arrest the said driving roll.

20. Means for positioning articles that carry designations in a raised line at a relative position at a station, comprising a slide carrying a turning roll movable to and from the article at said station, a second slide carrying a pair of contact rolls movable at said station on the opposite side of the conveyer, means to advance said slides to engage the article on opposite sides and to withdraw said slides and rolls, an electric circuit including a power device and also a clutch, a terminal member in said circuit for each of said contact rolls and upon both contact rolls being engaged by said raised line on the article and thereby shifted, both of said terminals are closed to energize said circuit and operate to open the clutch and arrest the said driving roll, and means to withdraw the slides and rolls upon said arrest of the turning means.

21. Means or positioning articles that carry designations in a raised line at a relative position at a station, comprising a slide carrying a turning roll movable to and from the article at said station, a second slide carrying a pair of contact rolls movable at said station on the opposite side of the conveyer, means to advance said slides to engage the article on opposite sides and to withdraw said slides and rolls, an electric circuit including a power device and also a clutch, a terminal member in said circuit for each of said contact rolls that is held open in the normal position of the contact rolls and upon both contact rolls being engaged by said raised line on the article and thereby shifted, both of said terminals are closed to energize said circuit and operate to open the clutch and arrest the said driving roll, a latch connected with the shiftable clutch member adapted to lock it in open position when opened by said power device, and which latch is shifted to release the clutch to close when the slide and driving rolls are retracted.

22. Means for positioning articles that carry designations in a raised line at a relative position at a station, comprising a slide carrying a turning roll movable to and from the article at said station, a second slide carrying a pair of contact rolls movable at said station on the opposite side of the conveyer, means to advance said slides to engage the article on opposite sides and to withdraw said slides and rolls, an electric circuit including a power device and also a clutch, a terminal member in said circuit for each of said contact rolls and upon both contact rolls being engaged by said raised line on the article and thereby shifted, both of said terminals are closed to energize said circuit and operate to open the clutch and arrest the said driving roll, and means to withdraw the slides and rolls upon said arrest of the turning means, a latch connected with the shiftable clutch member adapted to lock it in open position when opened by said power device, and which latch is shifted to release the clutch to close when the slide and driving roll are retracted.

23. Means for positioning articles that have a line of designations thereon to arrest the articles at a station, in a certain position relative to the designations including means for supporting and turning articles at said station, said supporting means including two contact members arranged to engage the article at two places respectively when the said line of designations reaches the pre-determined position, and arresting means controlled by said two members to arrest the turning means to stop the article at said position.

24. Means for positioning articles that have a line of designations thereon to arrest the articles at a station, in a certain position relative to the designations including means for supporting and turning articles at said station, said supporting means including two contact members arranged to engage the article at two places respectively, beyond the normal periphery of the article, when the said line of designations reaches the pre-determined position, and arrest means controlled by said two members to arrest the turning means to stop the article at said station.

25. A conveyor device including a pair of endless beltlike members, for conveying receptacles to stations along their travel, one of said members supporting the receptacles and the other member holding the receptacles, and means for exerting a pressure against the holder member to hold the receptacles between said members, comprising a stationary bar along the length of the holder member provided with spring pressed plungers and a flexible band in contact with the holding member, and means for lifting a portion of the said holder member to admit articles from the side thereof.

26. Means for positioning articles that have a line of designations thereon to arrest the articles at a station, in a certain position relative to the designations including means for supporting and turning articles at said station, said supporting means including a contact member arranged to engage the article at a place beyond the normal periphery of the article, when the said line of designations reaches the pre-determined position, and arresting means controlled by said two members to arrest the turning means to stop the article at said station.

Signed at New York city, N. Y., this 20th day of January, 1927.

JOSEPH MAGNUSSON.
CHARLES RAGNAR FREDSELL.